Oct. 28, 1930.  W. F. GRUPE  1,779,701
METHOD OF PRODUCING CORKBOARD AND RESULTING CORKBOARD
Original Filed June 30, 1927   2 Sheets-Sheet 1
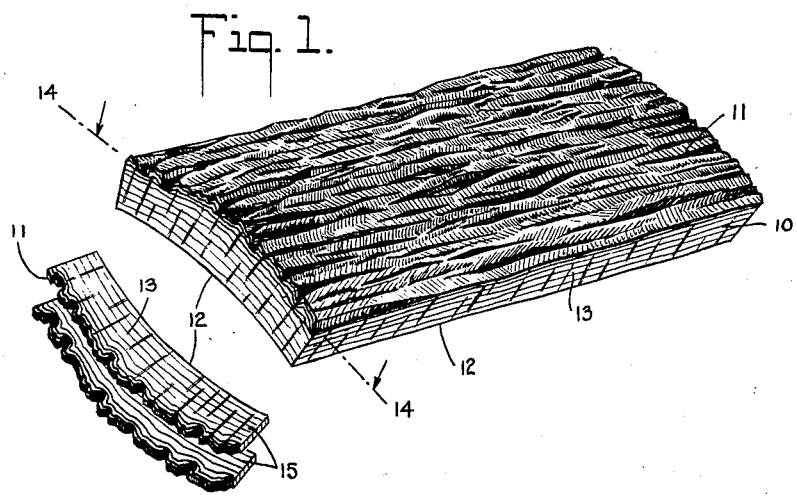
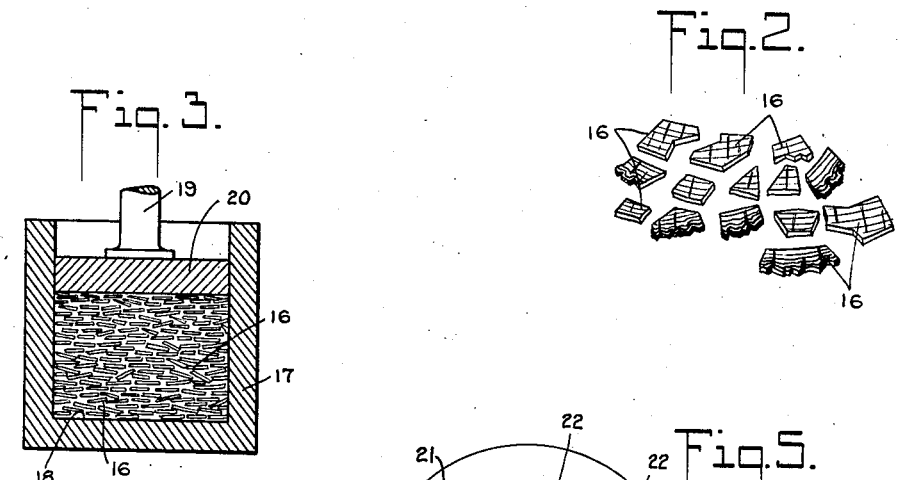
INVENTOR,
William F. Grupe,
BY
Henry J. Lucke,
His ATTORNEY.

Oct. 28, 1930.  W. F. GRUPE  1,779,701
METHOD OF PRODUCING CORKBOARD AND RESULTING CORKBOARD
Original Filed June 30, 1927  2 Sheets-Sheet 2
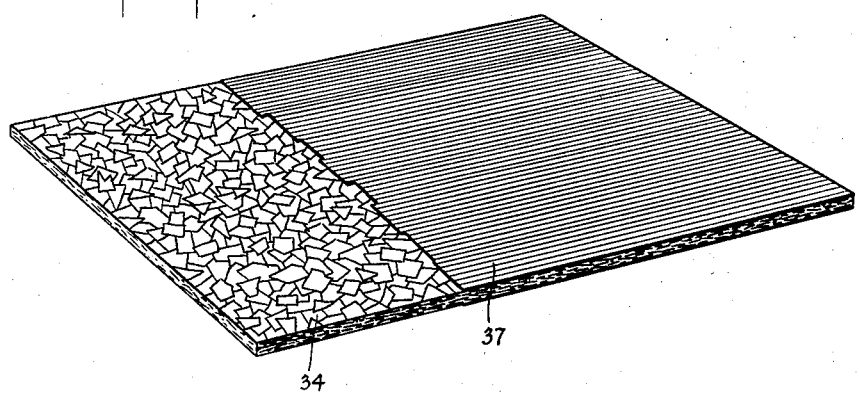
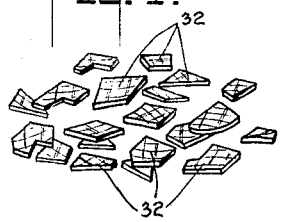
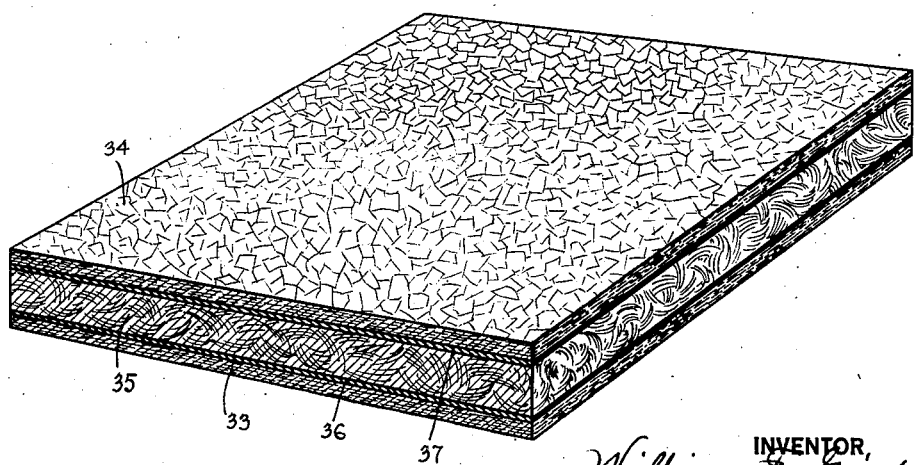
INVENTOR,
William F. Grupe,
BY
Henry J. Lucke,
his ATTORNEY.

Patented Oct. 28, 1930

1,779,701

UNITED STATES PATENT OFFICE

WILLIAM F. GRUPE, OF LYNDHURST, NEW JERSEY, ASSIGNOR TO ARMSTRONG CORK COMPANY, OF LANCASTER, PENNSYLVANIA, A CORPORATION OF PENNSYLVANIA

METHOD OF PRODUCING CORK BOARD AND RESULTING CORK BOARD

Application filed June 30, 1927, Serial No. 202,564. Renewed March 18, 1930.

This invention relates to an improved method of producing corkboard and the resulting corkboard.

Under the demands of present day uses, particularly for sheathing houses and like uses, corkboard employed as the thermal insulating material is required to be of greatly reduced dimension of thickness. Corkboard as produced commercially from cork granules under present day and previous practices is decidedly brittle, is readily chipped off at the corners and is easily abraded on the surfaces. Furthermore, such corkboard possesses a relatively low degree of resiliency, thereby giving rise to a high proportion of defective board at the cork factory and to a large amount of waste at the location of installation due to breakage when handled, and when sawed or otherwise cut in the necessary fitting operations.

Present corkboard by reason of being formed of granules or like spheroidal or ellipsoidal particles of cork, usually from one-eighth inch to three-quarters of an inch mesh, has voids on its faces and extending into the mass, and therefore readily absorbs water, moisture and like, giving rise to a low thermal co-efficient. When asphalt or like bonding material is applied to present corkboard formed from granules, the asphalt penetrates through the voids into and to a high percentage through the mass, thereby further decreasing the effective thermal resistance of the corkboard.

Furthermore, in the practice of deriving granules from natural cork, the woody portions, including the "hard-back" and "belly" portions, are removed, as far as practical subsequent to the grinding or other granulating procedure, thus giving rise to a loss of about twenty-five per cent. of the original cork volume.

Pursuant to my invention, plates are cut from the natural cork transversely to the length of the bark and are employed as the cork material for my molded products. The plates are then assembled in the mold in overlapping relation to one another and compressed, and suitably bonded to one another to form the board.

Such plates are preferably of the magnitude of approximately from one-half inch to one and one-half inches in length and breadth and of a thickness of approximately from one-sixteenth of an inch to one-eighth of an inch.

The bonding of the cork plates to one another may be had by the heat and pressure method whereby the resin natural in cork or added resin such as rosin or other water and moisture repellent or resistant binder, or both natural resin or such other binder are employed. If desired, the binder may be any of the well known adhesives for cork, and preferably of the water and moisture repellent or resistant types such as adhesives of the albumen or casein and lime composition. When bonded by adhesive, the plates are first baked and expanded, then mixed with adhesive and then charged in a suitable mold.

Pursuant to a preferred form of my invention, the plates are cut from the harvested blocks of natural cork transversely to the length of the bark by severing strips having uniform thickness corresponding to the thickness of the desired plates, and then breaking such strips into individual plates of the magnitude of length and width as above indicated. In the most preferred form of my invention such strips are cut substantially at right angles to the "hard-back" or "belly" faces. My invention is advantageous in that it permits the use of the "hard-back" or the "belly", or both, of the natural cork, since in the assembly of the plates as above described to form corkboard the "hard-back" or "belly" portions are distributed through the cork mass in such a manner that these relatively woody portions are brought into mere line contact with "pure" cork portions and notwithstanding effectively bonded.

Corkboard made pursuant to my invention is accordingly formed of individual constituent parts of relatively great length and breadth, thus enabling corkboard to be manufactured of reduced total thickness and to possess high flexibility, as well as a high co-efficient of thermal insulation. Furthermore, the opposite flat faces of my corkboard are constituted of individual plates which are flat and individually extend for appreciably increased distances in length and breadth. The edges of my corkboard, it will be observed, are composed of individual cork portions having integral edges of increased length and extending increased distances within the mass of the board, thus providing for an enhanced bending strength and physical resistance against chipping or abrasion.

The opposite flat faces and the interior of the mass of my corkboard are also free from openings or pores extending any substantial distance into the mass, by reason of the overlapping relation of the successively formed laminæ of the plates.

My corkboard is preferably baked at a temperature at which the resin inherent in the cork material or any added rosin or other binder is vaporized, thereby creating when cooled sealed air spaces in addition to the natural cellular structure, thereby obtaining a high co-efficient of thermal insulation through the body of the corkboard.

The structure of my corkboard lends itself admirably to being sawed or cut in the fitting operations, the resulting sawed or cut faces possessing sharp and strong corners, thus enabling the fitting to be accomplished with increased precision, and thereby obviating thermal leakage at the abutting edges of the corkboard. My corkboard also receives nails, bolts or other piercing fastening means without splitting.

Further features and objects of my invention will be more fully understood from the following detail description and the accompanying drawings, in which Fig. 1 is a perspective view showing a block transversely to the length of the bark of natural cork including its hardback and adjacent woody portion; this view also shows two strips severed from the cork block;

Fig. 2 is a perspective view of a number of plates derived from the strips severed as indicated in Fig. 1;

Fig. 3 is a vertical sectional view of one form of mold, and also indicating the molding and compression stage in the production of corkboard pursuant to my invention;

Fig. 4 is a perspective view of a portion of a corkboard derived by my invention; and illustrating the laminated structure effected by the compressed and baked cork plates;

Fig. 5 is a sectional view taken on line 5—5 of Fig. 4, pictured as viewed through a microscope, and indicating the overlapping laminated formation of my improved corkboard and also the presence of isolated small "dead" air pockets between the individual cork plates as well as in the natural cells of the same;

Fig. 6 is a perspective view, largely of diagrammatic character, of a corkboard made pursuant to my invention, of relatively thin total thickness, and having a flat face coated with asphalt or the like;

Fig. 7 shows in perspective a number of individual plates of "pure" cork, obtained from strips of "pure" cork; and Fig. 8 is a perspective view showing the assembly of two corkboards made pursuant to my invention and disposed on opposite sides of a block of mineral wool or other non-cork thermal insulating material and secured thereto by asphalt or similar bonding material.

Referring to Fig. 1 of the drawings, the block 10 of natural cork is obtained from the cork tree by the usual procedure. Such block comprises the "hard-back" face portion 11 at one face thereof and the "belly" portion 12 at the opposite face. The intermediate portion of the block 10 is so-called "pure" cork.

Such block 10 is now cut along planes indicated by the arrowed line 14—14 in Fig. 1, that is to say, transversely to the length of the bark, to obtain strips designated 15. Such plane 14—14 is preferably substantially at right angles to the "hard-back" face 11 and to the opposite disposed "belly" face 12, i. e., perpendicular to the yearly growth of the cork.

Such block 10, it is noted, as derived in nature has a curvature which depends upon the natural formation of the tree, and if desired, each block 10 may be flattened out by steaming or other procedure well understood in the art.

The resulting strips 15 are then sub-divided into smaller entities herein termed "plates," of the general form indicated at 16 in Fig. 2. It is observed that the plates 16 derived from a single strip 15 average from 15 to 25 percent of "hard-back" or "belly" or other woody portion, the remainder being so-called "pure" cork. As above indicated, the thickness of each plate may range from approximately one-sixteenth of an inch to one-eighth of an inch and its length and breadth approximately one-half an inch to one and a half inches.

The resulting plates for the manufacture of corkboard are charged into a mold 17 of desired shape, the flat face of the interior of the mold being positioned substantially horizontally, whereby the plates 16 are assembled within the mold with their flat faces disposed substantially horizontally and substantially parallel to one another, and the resulting laminæ have each a thickness corresponding substantially to the thickness of the individual plates. In charging the plates 16 into the mold 17, the mold may be subjected to vibration, as by means of a suitable tapping tool (not shown), to expedite the positioning of the plates 16 in such parallel relationship.

By such charging procedure, the plates are brought into more or less overlapping relationship to one another, and upon subjecting the plates 16 to pressure, as by means of the plunger 19 acting upon the movable cover plate 20 of the mold 17, or by equivalent compressing operation, the mass formed by the constituent plates is compressed to the desired degree. The compression may vary as desired, but usually is approximately within the range represented by the reduction in volume from 1½ to 1 to that represented by the reduction in volume from 3 to 1.

By reason of the corkboard being formed of flat particles of relatively increased width and length as compared with their thickness, a relatively high extent of facial contact between plates of contiguous laminæ is secured, thereby precluding the formation of openings or pores extending through the mass of the resulting corkboard or to any material extent into the interior of the mass.

The bonding of the plates to form my corkboard may be carried out by the so-called heat and pressure treatment or by the use of an adhesive. In the heat and pressure treatment, the mold containing the compressed cork plates is subjected to a temperature to effect the vaporization of the resin natural in cork, and bringing about the distribution of the resin throughout the mass.

In Fig. 4 I have illustrated a portion of the mass of a corkboard 21 formed pursuant to my invention. It will be observed that openings such as 22, see Fig. 4 and Fig. 5, which may be present on any flat face are bottomed by solid portions of a contiguous plate or plates on the immediately adjacent lamina; similarly, any openings 23 within the mass of my corkboard extend only for the thickness of its lamina, and are wholly "sealed" by mechanical pressure and by resin with the contiguous faces of plates of the adjacent laminæ, to form individually isolated pockets.

By reason of my corkboard being formed of relatively long and wide constituent particles which are "felted" as laminæ to one another, my corkboard possesses a high degree of resiliency, and enables the same to be handled in shipment and during the cutting and fitting operations with minimum breakage and waste.

In such uses, where it is desired to increase the flexibility of my corkboard, the constituent plates are cut of a thickness less than one-eighth of an inch, thus providing for an increased number of laminæ or layers for any given thickness of resulting board, accompanied by an increased interfelting action between the laminæ or layers of the plates. Where it is desired to have a less degree of flexibility, the constituent plates are cut of a greater thickness, with a resulting less number of laminæ or layers for any given thickness of corkboard.

Preferably, the strips from which the plates are formed, are cut to have a uniform thickness.

In my product, the hard-back is distributed through the mass of the formed corkboard and by my method of assembly any particular portion of hard-back is brought into mere line contact with cork of "pure" quality and a satisfactory bonding therewith is derived, for the reason that each portion of hard-back has integrally attached thereto cork of "pure" quality, which latter effects a maximum bond with the cork of "pure" quality of adjacent plates.

My plate structure of corkboard attains a stiffness at the edges and permanency of outer flat faces owing to the relative increased integral dimensions of the individual plates.

In Fig. 7 I have illustrated a number of plates 32 of "pure" cork, corresponding to the cork plates illustrated in Fig. 2, but free from "hard-back" and "belly" portions. Corkboard may likewise be formed of such "pure" cork plates, similar to the procedure hereinabove set forth. In Fig. 6 I have illustrated a corkboard 34 having standard length and width dimensions and of relatively thin thickness. This view also illustrates the substantial uni-planar relationship of the plates constituting the opposite flat faces of the cork-board, and also illustrates the sharp corners and edges at the lateral faces of the corkboard.

My plate form of corkboard lends itself admirably to receiving an extremely thin coating 37 of asphalt or the like for bonding, facing and other purposes.

In Fig. 8 I have illustrated the adaptation of my invention with non-cork thermally insulating material as for example with a block 35 of mineral wool or the like, with which blocks of my corkboard are assembled on the opposite flat faces and secured thereto by asphalt or the like. Specifically, Fig. 8 illustrates such core 35 of non-cork composition of thermally insulating material, a block 33 of my corkboard of reduced thickness secured by a coating 36 of asphalt or equivalent to one face of the block 35, and a block 34 of corkboard secured by a coating 37 of asphalt to the opposite face of the block 35. Such composite block of cork and non-cork thermally insulating materials may be sawed, cut or otherwise handled similar to ordinary corkboard, and firmly receives nails, brads, screws and other fastening means without splitting.

Such composite block may be made or standardized in any desired dimensions, and utilized as substitutes for blocks, slabs or boards of wholly cork material, in the construction of residences, commercial buildings, refrigerating plants and other building construction, refrigerator cabinets and other products.

My composite blocks, slabs or boards conserve the total amount of cork employed for thermal insulation, by the employment of the non-cork constituent. My composite material is particularly advantageous in the forms wherein the cork serves as the outer or facing material, thereby imparting to the composite block the particular and advantageous characteristics of cork, namely, among other things, the resistance or absence of absorption of water, moisture, gases and other foreign substances, as compared with mineral wool, vegetable wool or fiber and like thermal insulating material.

Great economy is effected in the amount of fuel required for heating buildings embodying my corkboard in the walls, ceilings, roofs and the like, and also are rendered cooler during the summer or hot atmospheric conditions.

My composite board is substantially non-inflammable and accordingly greatly minimizes fire hazard.

In the construction of the refrigerator cabinets, my composite board may be employed as a substitute for ordinary corkboard between the wall material, or may be formed as the integral walls respectively of the cabinet, to serve as substantially the entire wall material of the cabinet, as is set forth in my co-pending application, Serial No. 198,673, filed by me on June 13th, 1927.

My method of producing corkboard from plates lends itself admirably to the continuous process in the manufacture of sheets. To carry out such continuous process, I arrange a series of hydraulic presses or other suitable pressure machines, having vertically reciprocated platens, and fixed flat bases cooperating with the platens. An endless conveyer band of steel passes over suitable driving and guiding pulleys and slides over the fixed bases of the presses, and similarly an endless conveyer band of steel passes over suitable driving and guiding pulleys a regulatable spaced distance above the lower conveyer band and under the reciprocated platens. The cork plates are fed on the lower conveyer band. The bases and the platens of the presses are heated by steam or other suitable medium to the desired temperature for baking the cork plates.

The platens of the presses are moved simultaneously downward to clamp the endless conveyer bands and the interposed cork plates, to thereby apply the desired degrees of compression and also subject the cork plates to the desired baking temperature, while the bands are quiescent. Upon release of the platens by upward movement, the conveyer bands are moved to progress the cork material to the next pressure machine.

The lateral openings between the bands affords the discharge of moisture and other vaporized substances, and during the intervals of the release of the compression bands, the vaporization of the moisture and other substances takes place more freely.

The compression is regulated for the successive stages of compression, to derive the desired ultimate thickness of the sheet. The heated presses may be disposed within an enclosure or hood. A final set of similarly operated presses, through which cooled water passes, serves to chill the cork sheet under pressure.

In the baking operation effected by the succession of heated presses, the resin natural in cork and any added resin or other binder, is distributed through the baked cork mass, and upon cooling of the sheet by the cooling presses, the hardened resin serves as the bonding medium between the constituent cork plates.

By manufacturing the corkboard in large or continuous sheets, full dimensions of corkboard for ultimate uses are produced, without requiring cutting and fitting operations of corkboard from smaller sizes as are standard in present day practice. Thus for sheathing uses and other buildings, the corkboard is supplied by my sheet producing method for the full length and width between the studding or other fixed wall parts, adapted to be nailed or otherwise secured in position without cutting, trimming or other fitting operations.

By reason of the flexibility imparted to the cork sheet by my process of manufacture, thin sheets may be shipped in roll form and readily handled in rolled or unrolled condition without breakage or other damage to the sheet.

The trade today recognizes the standard of quality of corkboard, (made pursuant to present day practice from cork granules) which is based upon the weight per unit volume of corkboard. Such standard is necessarily dependent upon the factors of the proportion of hard-back and other wood portions, dirt and other foreign materials, as well as upon the proportion of so-called "pure" cork. Furthermore, "pure" cork varies between wide ranges, one extreme being represented by the spongy or large celled of cork minimum or substantially nil sap content, and the other extreme, virgin cork of small cellular formation and high sap content. Classifying corkboard under such unit weight standard, of course, has no bearing on the proportion of pores, openings and other voids at the surfaces and through the mass of the corkboard.

Corkboard manufactured by my invention possesses characteristics which are highly superior to corkboard made from granules and standardized on such unit weight basis. These advantageous characteristics of my corkboard are:

1, minimum quantity of solid material per unit volume derived by employing plates as the "raw" material and utilizing minimum compression in the manufacture of the board;

2, substantial absence of direct openings or other voids at the outer faces of the corkboard and the isolation and sealing of all air pockets within the mass of the corkboard, thereby preventing the entry and lodging therein of fluids and other foreign substances; and 3, the presence of sharp edges and smooth end-faces of my corkboard, enabling accurate sawing and other fitting operations to provide accurate inter-fitting of abutting end-faces of adjacent corkboard blocks, and requiring a minimum layer of asphalt or other adhesive or cementing material at the abutting joints.

Suitable finish or suitable facing may be applied to my cork product by any suitable procedure. A convenient form of finish or facing is attained by the use of a thin coating of asphalt, usually applied in hot state, then allowed to cool and harden, upon which enamel, duco, or other finish is applied. My cork product may be finished by the use of any suitable form of plastic finishing material. In a similar manner, veneer wooden strips, tiles or the like, may be applied by the use of suitable adhesive or cement.

Whereas I have described my invention by reference to specific forms thereof, it will be understood that many changes and modifications may be made without departing from the spirit of the invention.

I claim:

1. The method of forming corkboard which comprises severing natural cork transversely to the length of the bark to form strips having lengths relatively much greater than their thicknesses, subdividing such strips into plates while substantially preserving the dimension of thickness of the same, the dimensions of length and breadth of said plates individually being materially greater than the dimension of thickness, baking said plates in a mold and compressing and bonding said plates to one another to form corkboard.

2. The method of forming corkboard which comprises severing natural cork transversely to the length of the bark to form strips having lengths relatively much greater than their thicknesses, subdividing such strips into plates while substantially preserving the dimension of thickness of the same, the dimensions of length and breadth of said plates individually being materially greater than the dimension of thickness, assembling said plates irregularly in overlapping relation but having their opposite flat faces disposed substantially horizontally, to thereby position the plates forming the opposite flat faces of the resulting corkboard in substantial parallel alignment with one another and compressing and bonding said plates to one another to form corkboard.

3. The method of forming corkboard which comprises severing natural cork including "hard-back" or "belly" portions transversely to the length of the bark to form strips having lengths relatively much greater than their thicknesses, subdividing such strips into plates while substantially preserving the dimension of thickness of the same, the dimensions of length and breadth of said plates individually being materially greater than the dimension of thickness, baking said plates in a mold and compressing and bonding said plates to one another to form corkboard.

4. The method of forming corkboard which comprises severing natural cork including "hard-back" or "belly" portions transversely to the length of the bark to form strips having lengths relatively much greater than their thicknesses, subdividing such strips into plates while substantially preserving the dimension of thickness of the same, the dimensions of length and breadth of said plates individually being materially greater than the dimension of thickness, assembling said plates irregularly in overlapping relation but having their opposite flat faces disposed substantially horizontally, to thereby position the plates forming the opposite flat faces of the resulting corkboard in substantial parallel alignment with one another and compressing and bonding said plates to one another to form corkboard.

5. Corkboard formed substantially wholly of plates of natural cork cut transversely to the length of the bark, said plates having dimensions of length and breadth materially greater than the dimension of thickness, the dimension of thickness being of the range from one-sixteenth of an inch to one-eighth of an inch.

6. Corkboard formed substantially wholly of plates of natural cork cut transversely to the length of the bark and including "hard-back" or "belly" portions, said plates having dimensions of length and breadth materially greater than the dimension of thickness, the dimension of thickness being of the range from one-sixteenth of an inch to one-eighth of an inch, said plates respectively having lengths much greater than their thicknesses.

7. Corkboard formed substantially wholly of plates of natural cork cut transversely to the length of the bark, said plates individually having dimensions of length and breadth materially greater than the dimension of thickness, the dimension of thickness being of the range from one-sixteenth of an inch to one-eighth of an inch, said plates being disposed irregularly in overlapping relationship in laminæ substantially parallel to one another.

In testimony whereof I have signed this specification this 27th day of June, 1927.

WILLIAM F. GRUPE.